9821X
T. J. Burhyte,
Saming Shingles,
Patented July 1, 1836.
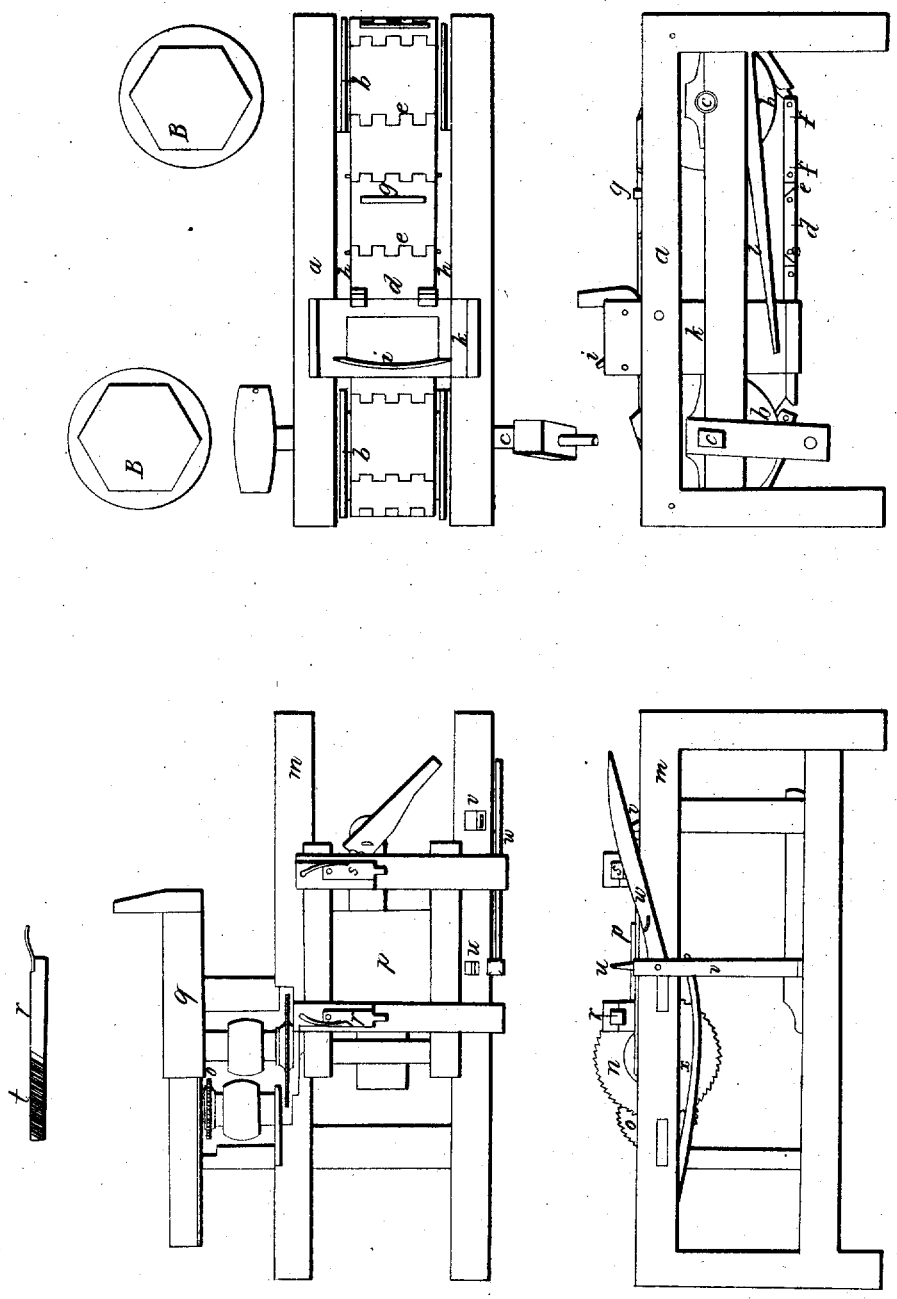
AM. PHOTO-LITHO. CO. N.Y. (OSBORNE'S PROCESS)

9821X

Tunis S. Buckly Barton New York
Letters Patent

The Schedule referred to in these Letters Patent and making part of the same
containing a description in the words of the said Tunis S. Buckly him-
self of his improvement in the machine for shaving shingles —

Be it known that I Tunis S. Buckly of Barton in the County of Tioga
and State of New York have invented a new and useful improvement being
a machine for shaving shingles called Buckly's Shingle Machine
which is described as follows reference being had to the annexed drawings
of the same making part of this specification.
This machine consists of a rectangular frame a
of sufficient size and strength to contain and support the machinery
brought [illegible] at each end of which frame is a hexagonal or octagonal
or other sided wheel b b of cast iron or other material fixed permanently on
shaft c c revolving in boxes in the [illegible] part of the frame. Around these wheels
passes an endless chain of [illegible] platforms [illegible] joints d of cast iron or [illegible]
of wrought iron [illegible] each joint being [illegible] the same size as each side of
the polygonal wheel and of any number required according to the distance
apart it is thought proper to place the wheels and on the outer surface of
each joint a very strong [illegible] joint [illegible] according to the length
of the shingles to be shaven is formed a projection e f g of iron on which
the shingle [illegible] and by which it is forced through between the knife and
[illegible] the [illegible] being [illegible] from sagging or giving way at the
place where the shaving is performed by means of [illegible] h is a cutting
[illegible] the knife [illegible] something like a common plane
[illegible] in the [illegible] frame [illegible] which may have a
[illegible] of unequal thickness should
[illegible] in the sides of the main
[illegible] frame
[illegible] Tunis S. [illegible]

[illegible]

distance apart equal to the length of the Shingles the joints of the flexible
platform are alternately raised or depressed on the [illegible] [illegible] for the
purpose of shaving a [illegible] [illegible] as required and are marked to enable the
[illegible] to distinguish the depressed or raised part when the machine is
in operation so as to [illegible] in placing the shingle to be shaved.

The power to drive the machine is applied to one of the axles of the
polygonal wheels and may consist of horse, water, or steam power.

The lengths to be cut into shingles is first placed in a common saw
mill and sawed through the [illegible] into four equal parts lengthwise which
will then open the [illegible] of [illegible] and enable the operator to avoid them
in cutting the timber into bolts the timber is then cut into bolts of the required
length. these are then removed to the machine for cutting them into shingles
which consists of a suitable frame [illegible] upon which are arranged two circular
saws U.L driven by pulleys and bands in the usual manner — one for sawing
the shingle — the other for dressing or jointing the edges: also a carriage [illegible]
to hold the bolt, and a carriage [illegible] on which to rest the shingle to be jointed.
In the carriage to contain the bolt are [illegible] [illegible] furnished with suitable
dogs for holding the bolt, and two self setting racks for feeding the machine
these racks are operated by [illegible] [illegible] in the main frame against
which the [illegible] teeth of the racks are brought in contact and which [illegible]
[illegible] a distance equal to the thickness of the required shingle.
One of the [illegible] has a [illegible] movement regulated by a [illegible] and
spring [illegible] produced by the movement of the carriage [illegible] alternate [illegible]
in the self regulating racks to [illegible] for a point or butt of a shingle.

Each carriage are worked by hand when the shingle is cut from the
bolt the carriage is drawn back and at this movement the racks with the
bolt are advanced the distance required for a shingle [illegible] the shingles
[illegible] [illegible] removed to the jointing carriage and [illegible] by hand and
being jointed [illegible] removed to the shaving machine [illegible] upon the
flexible revolving platform [illegible] under the knife which shaves it
[illegible] [illegible] [illegible] [illegible] [illegible] [illegible] the [illegible]
[illegible]
[illegible]

9821X

What I claim as my invention and which I desire to secure by Letters Patent consists in the before described Machine for Shaving Shingles by means of an [illegible] revolving flexible platform & making Knives whether [illegible] [illegible] in the precise manner here described or in any other operating on the same principle

Witnesses
Wm P Elliot
[illegible] [illegible]

[illegible] [illegible] [illegible]

924 [illegible]

Drawing